United States Patent [19]

Schoen

[11] Patent Number: 4,974,720
[45] Date of Patent: Dec. 4, 1990

[54] PRESSURELESS APPARATUS FOR ALIGNING VARIOUS OBJECTS, NOTABLY BOTTLES

[75] Inventor: Pierre Schoen, Eckwersheim, France
[73] Assignee: Gebo Industries, Reichstett, France
[21] Appl. No.: 361,311
[22] Filed: Jun. 2, 1989

[30] Foreign Application Priority Data

Jun. 7, 1988 [FR] France .............................. 88 07737

[51] Int. Cl.⁵ ........................................... B65G 47/26
[52] U.S. Cl. .................................... 198/434; 198/453
[58] Field of Search ............... 198/434, 453, 454, 398

[56] References Cited

FOREIGN PATENT DOCUMENTS 178028 4/1986 European Pat. Off. ............. 198/454
3500660 7/1986 Fed. Rep. of Germany ...... 198/453
3715577 11/1988 Fed. Rep. of Germany ...... 198/453
2178389 2/1987 United Kingdom ................ 198/454

Primary Examiner—Joseph E. Valenza
Attorney, Agent, or Firm—Sandler, Greenblum & Bernstein

[57] ABSTRACT

Pressureless apparatus for aligning miscellaneous objects, notably bottles, including a feed conveyor having a plurality of tracks, an intermediate conveyor consisting of a plurality of juxtaposed elementary paddled chains, a curvilinear guide plate overlying the paddle-chains, and a single-track output conveyor. To prevent the bottles from forming a double row at the ingress of the output conveyor and to reduce the overall dimensions of the pressureless aligner, the intermediate conveyor leads to a transitional conveyor that includes a mechanism for aligning the bottles which tend to form a second row in the single-track output conveyor.

10 Claims, 1 Drawing Sheet

PRESSURELESS APPARATUS FOR ALIGNING VARIOUS OBJECTS, NOTABLY BOTTLES

BACKGROUND OF THE INVENTION

1. Field of the Invention

This invention relates to a pressureless apparatus for aligning various objects, such as bottles, which comprises a multi-track feed conveyor, an intermediate conveyor consisting of a plurality of juxtaposed paddled chains overlying these chains and a curvilinear guide-plate leading to a single-track output conveyor.

This invention is intended more particularly for the industrial branch concerned with the conveyance of miscellaneous objects, notably bottles.

2. The Prior Art

It is known to use conveyors of the type called pressureless aligners for narrowing a stream of objects disposed at random on a relatively wide conveyor, so as to canalize these objects to form a single row or line feeding any treatment or processing unit.

Thus, in the field of conveyors for containers and more particularly bottles, these aligners are disposed upstream of machines such as filling machines, label-sticking machines, capsuling machines or other machines, in order to feed these machines with bottles supplied one by one and in line.

Of course, these pressureless aligners comprise a multi-track feed conveyor on which the bottles disposed at random are caused to move at a relatively low speed. This feed conveyor leads to an intermediate conveyor consisting of a plurality of elementary curvilinear paddle-chains disposed side by side and over which a likewise curvilinear guide-plate is provided for pushing the bottles transversely from one paddle-chain to the next paddle-chain. Each track of this intermediate conveyor is driven at a different speed, this speed increasing in a direction across the direction of travel of the bottles, in order to gradually accelerate the bottles and reduce the width of the stream of bottles delivered to the feed conveyor proper.

At the output end of this intermediate conveyor, it is essential that the various bottles form a single row before engaging an output conveyor reduced to a single track. In fact, if two bottles happened to engage side by side the imput end of this output conveyor, they might block the passage and thus interrupt the bottle supply, which eventually will cause stoppage of the plant. It is also possible that one of these bottles may be discharged from the conveyor and dropped into an adjacent recovery bin. However, this implies the frequent intervention of an operator for reintroducing the bottles contained in the recovery bin into the feed circuit. However, the most recurrent consequence is the breakage of one and/or the other of the bottles forming a double row under the pressure of the oncoming bottles. As a result, of course, glass fragments particularly dangerous for the operators standing in the vicinity would be thrown therearound. Moreover, the glass fragments remaining on the output conveyor may also cause the stoppage of the treatment unit disposed dowstream or the undesired release of mechanical or optical sensors disposed along the conveyor and delivering data to a plant control unit.

A first solution aiming at reducing the above-defined risks consists in extending considerably the length of the intermediate conveyor so that the probability of the simultaneous engagement of two bottles at the input end of the output conveyor be substantially zero.

Now, in fact, the present trend is to minimize the floor space of this type of intermediate or transitory conveyor, so as to reduce the size of the equipments and, eventually, of the rooms in which they are installed.

Pressureless aligners are also known which are constructed substantially on the basis of the aligner broadly described hereinabove, which comprises an intermediate conveyor inclined transversely with respect to the direction of travel of the bottles, this cant being in the range of about 5° to 8°. Thus, the stream of bottles travelling on the feed conveyor are led to the lower portion of the intermediate conveyor and driven by the paddle-chains along the guide-plate which in turn directs the bottles towards the upper portion leading to the single-track output conveyor.

The cant of the intermediate conveyor facilitates on the one hand the bottle alignment and on the other hand the removal of the glass fragments or of the recumbent bottles disposed on this intermediate conveyor. Nevertheless, the risk of allowing bottles to form a double row persists and consequently the length of this pressureless aligner is still considerable.

Of course, the use of any kind of pressure for aligning the bottles must be avoided since as it is not only a source of noise, but increases the number of bottles broken as a consequence of the frequent knocking of the bottles against one another.

SUMMARY OF THE INVENTION

In fact, it is the object of the present invention to avoid all of the aforementioned shortcomings of prior art structures. This invention resolves the problems associated with known structures by providing a pressureless apparatus for aligning various objects, which includes a multi-track feed conveyor, an intermediate conveyor consisting of a plurality of juxtaposed elementary paddle-chains, and a curvilinear guide-plate overlying these chains, and a single-track output conveyor, with the intermediate conveyor leading to a transitional conveyor of curved configuration, disposed upstream of the output conveyor and comprising means for aligning the bottles tending to form a double row.

The advantages resulting from this invention reside essentially in the fact that the curved configuration of this pressureless aligner permits both the aligning bottles tending to form a double row, and the substantial reduction of the overall dimensions of the equipment.

The invention will now be described in greater detail with reference to the accompanying drawing illustrating diagrammatically by way of example typical forms of embodiment.

THE DRAWINGS

DESCRIPTION OF THE PREFERRED EMBODIMENT

Figure 1:
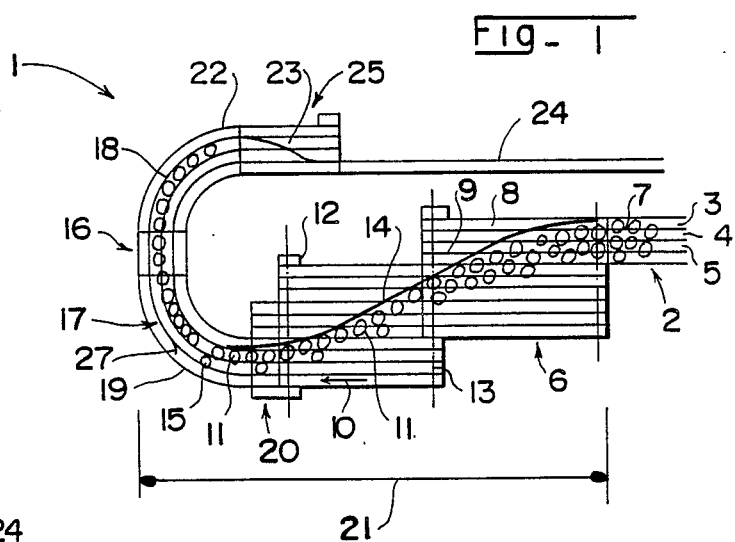
FIG. 1 is a diagrammatic plan view of a pressureless aligner according to a first form of embodiment of the invention.

The pressureless aligner 1 according to the present invention and shown in the various Figures of the attached drawings is intended for conveying miscellaneous objects between two separate treatment units disposed the one upstream and the other downstream of the processing line.

As a rule, these treatment units operate at different production rates so that a buffer stock builds up on the conveyor disposed between the units. As a rule, this buffer stock of objects is formed by slowing down and distributing the objects delivered at a regular rate from the upstream treatment unit on a multi-track conveyor. Eventually, the stream of objects to be conveyed, for example bottles, which has thus been formed must again be narrowed to permit the feeding of the downstream treatment unit with objects delivered in a single row.

For this purpose, an apparatus capable of aligning the objects until they form a single row is used, and the overall dimensions of this aligner must be as small as possible in order to reduce the overall dimensions of the complete production plant.

However, if relatively fragile objects are handled, a pressureless aligner capable of reducing the stream of objects to a single row must be used, without causing these objects to exert an excessive pressure against one another.

This feature is a must notable when the objects to be transported are containers such as bottles. In fact, when the alignment is obtained by exerting a pressure, the glass of which these bottles are generally made is exposed to heavy pressures and in addition the shocks between the bottles generate a loud noise detrimental to the personnel.

Thus, the present description refers to a pressureless aligner incorporated in a bottle transport system. However, this aligner may also advantageously be used for transporting objects of different shapes, dimensions and nature.

More particularly, the pressureless aligner according to the present invention comprises a feed conveyor 2 having several tracks 3, 4, 5 disposed side by side and driven at the same linear speed. This feed conveyor 2 leads to a multi-track intermediate conveyor 6 for accelerating and narrowing the stream of bottles 7 received from feed conveyor 2.

The intermediate conveyor 6 comprises a plurality of juxtaposed elementary paddle chains 8, 9 . . . each driven at a different speed increasing transversely with respect to the direction of travel of the bottles 11, which is designated by the arrow 10. This arrangement is well known to those conversant with the art who can easily calculate the speed gradient as a function of the type of objects to be transported, notably of the weight of the bottles and their general dimensions. Likewise, these elementary paddle-chains 8, 9 . . . are driven at differential speeds by power means 12 and transmission means 13 already known per se.

Overlying this intermediate conveyor 6 is a curvilinear guide-plate 14 adapted to push gradually the bottles 11 delivered by the feed conveyor 3 from the low-speed tracks to the faster tracks. Thus, the bottles 11 are gradually accelerated and the width of the stream of bottles 7 delivered to the intermediate conveyor 6 is gradually reduced.

At the output end of this intermediate conveyor 6 the bottles 11 are substantially aligned to form a single row, i.e. one behind the other, with from time to time a bottle 15 kept outside this single row. To re-insert these 'rebellious' bottles into the line of 'disciplined' bottles 11 by using the same method as that causing the narrowing of the stream of bottles 7 would require a considerable complementary elongation of the intermediate conveyor 6, without warranting inasmuch a hundred per cent efficiency.

Advantageously and according to a feature characterizing the present invention, this intermediate conveyor 6 leads to a curvilinear transitional conveyor 16 provided with means 17 for aligning the bottles 15 remaining in a second row.

According to a preferred form of embodiment, these means 17 consist of a curvilinear guide-plate 18 overlying the transition conveyor 16 and continuing the guiding action exerted on bottles 11 and 15, substantially in the middle and externally of the curve 19 leading to the downstream end 20 of intermediate conveyor 6. In fact, this taking over of bottles 11 and 15 by guide-plate 18 takes place on the bottle side opposite the side exposed to the guiding action exerted by guide-plate 14 associated with and overlying said intermediate conveyor 6. With this specific arrangement, the frictional forces exerted on the out-of-rank bottles 15 are slightly increased so as to push these bottles between two adjacent aligned bottles 11 travelling freely on the transitional conveyor 16. Preferably, the upstream end 27 of this guide-plate 18 is curved substantially outwards along the curved section 19 so that the non-aligned bottles 15 will not strike the edge of said guide-plate 18.

The advantages resulting from this specific feature of the pressureless aligner 1 of the present invention lies in the fact that its total length 21 is substantially inferior to that of hitherto known pressureless aligners while warranting a perfect alignment of the bottles. As a result, of course, the overall dimensions of the aligner are reduced considerably. On the other hand, the addition of a curved conveyor makes it possible to easily modify the configuration of the pressureless aligner so as to incorporate it without any major difficulty in all types of plants. This feature will be described more in detail presently.

Since the transitional conveyor 16 is necessarily of the multi-track type, comprising from 2 to 4 elementary paddled chains 22, 23, the bottles must be oriented towards a single-track output conveyor 24 leading to the downstream end 25 of said transitional conveyor 16. For this purpose, the curvilinear guide-plate 18 overlying this transitional conveyor 16 causes the bottles 11, at said downstream end 25, to follow a trajectory having a transverse component so as to urge the bottles towards the output conveyor 24.

Besides, the intermediate conveyor 6 may, if desired, be inclined in the direction of travel of the bottles 11 to permit the removal of the recumbent bottles and also of the glass fragments at the output end of said intermediate conveyor 6 and, more particularly, at the level of the first curve 19 of said transitional conveyor 16 leading to its downstream end 20. It will be seen that the gap left between the guide-plate 18 and the plane of the elementary paddle-chains 22, 23 must be sufficient to permit the passage of the recumbent bottles.

The aforesaid inclination of the intermediate conveyor 6 in the direction of travel of the bottles eliminates in certain cases the problem arising from the transverse cant. In fact, this cant causes generally the fall of larger bottles. Moreover, the connections with the feed conveyor and the output conveyor are in many cases more complicated due to the cant which must also be imparted to these conveyors.

Figure 2:
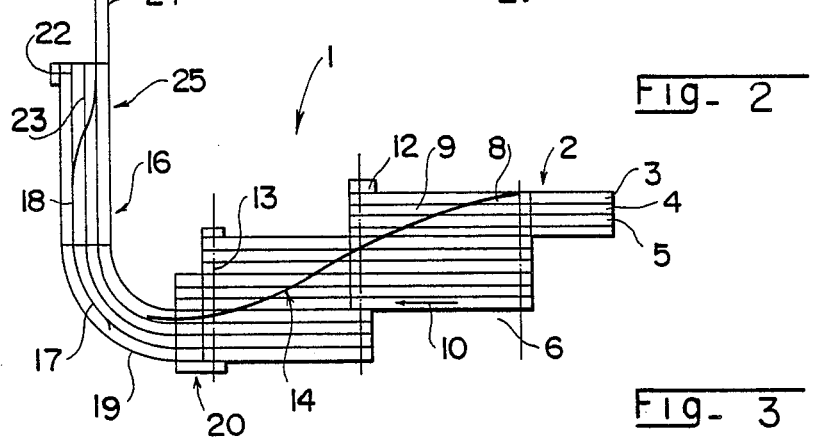
FIG. 2 is a diagrammatic plane view showing the pressureless aligner in a different arrangement.
Figure 3:
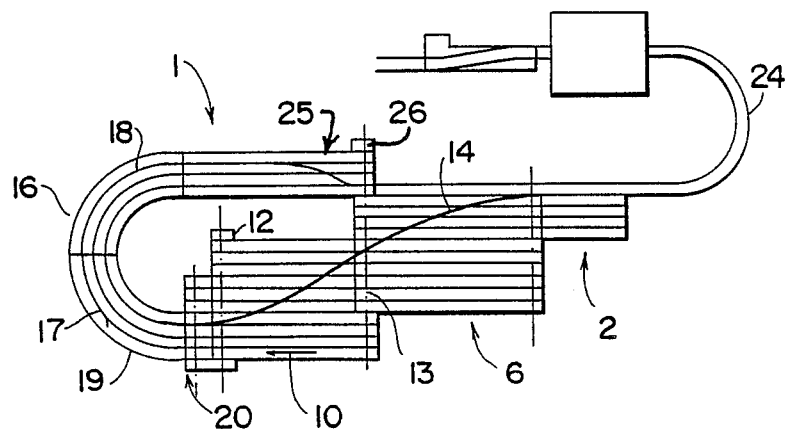
FIG. 3 is a diagrammatic plan view showing the pressureless aligner according to another form of embodiment of the invention.

Three different types of aligner configurations are illustrated in FIGS. 1, 2 and 3, respectively. Thus, in FIG. 1, the single-track output conveyor 24 is substantially parallel to the feed conveyor 2. In FIG. 2, the pressureless aligner 1 has a substantially L-shaped configuration imparting to the bottles at its exit end a direction perpendicular to the input direction. Of course, this pressureless aligner 1 may have any desired and suitable intermediate configuration between the positions shown in FIGS. 1 and 2. Thus, the angle formed between the feed conveyor 2 and the output conveyor 24 may range from 90° and 180°. However, it was observed in actual practice that by limiting this angle to a value lying between 130° and 180° the pressureless aligner will operate very satisfactorily while minimizing its overall dimensions.

In the modified arrangement illustrated in FIG. 3, the bottles travel in the same direction at the input and output ends of the system. In this case, the pressureless aligner has an S-shaped configuration, and the transitional conveyor 16 and the single-track output conveyor 24 are both curved to form 180-degrees sections.

Thus, it will be seen that the pressureless aligner 1 according to the present invention is adaptable to all types of plants while preserving a relatively reduced overall floor space.

In connection therewith, it will be seen that in the specific arrangement illustrated in FIG. 3 the single-track output conveyor 24 of the pressureless aligner 1 consisting, according to this definition, of a single elementary paddle-chain, is juxtaposed with the different elementary paddle-chains 3, 4, 5 constituting the intermediate conveyor 6. With this arrangement, it is possible on the one hand to reduce the transverse dimensions of the pressureless aligner 1 and, on the other hand, to drive some of the elementary paddle-chains of the intermediate conveyor 6, of the transitional conveyor 16 and of the output conveyor 24 by using conventional and known power means.

In addition to the above-mentioned objects and advantages of the pressureless aligner of the present invention, notably the reduction of its overall dimensions, this system is also advantageous in that it has a great flexibility permitting to adapt it to different shapes and applications.

I claim:

1. Apparatus for pressureless alignment of objects comprising:
   (a) a multi-track feed conveyor;
   (b) an intermediate conveyor comprising a plurality of juxtaposed paddle-chains;
   (c) a first curved guide plate overlying said intermediate conveyor tending to substantially align said objects into a single track;
   (d) a single-track output conveyor;
   (e) a transition conveyor following a curved path, said transition conveyor being located upstream of said output conveyor and being fed by said intermediate conveyor; and
   (f) a second curvilinear guide plate overlying and extending substantially from the middle and externally of a curved section of said transition conveyor for guiding and further aligning said objects on said transition conveyor into a single track, with said second guide plate being positioned to accept objects on a side opposite to the side that objects are located on said first curved guide plate overlying said intermediate conveyor.

2. The apparatus for pressureless alignment according to claim 1, wherein said transition conveyor comprises a plurality of paddle-chains.

3. The apparatus for pressureless alignment according to claim 2, wherein said intermediate conveyor comprises a plurality of paddle-chains.

4. The apparatus for pressureless alignment according to claim 1, wherein said second curvilinear guide plate includes an upstream end curved substantially outward.

5. The apparatus for pressureless alignment according to claim 1, wherein said curvilinear guide plate includes an upstream end curved substantially outward in said curved section.

6. The apparatus for pressureless alignment of objects according to claim 1, wherein said multi-track feed conveyor and said output conveyor are at an angle to each other in the range of about 90° to 180°.

7. The apparatus for pressureless alignment of objects according to claim 1, wherein said multi-track feed conveyor and said output conveyor are at an angle to each other in the range of about 130° to 180°.

8. The apparatus for pressureless alignment of objects according to claim 1, having an S-configuration, with said transition conveyor and said output conveyor being curved to substantially 180°.

9. The apparatus for pressureless alignment of objects according to claim 1, wherein said intermediate conveyor and said transition conveyor comprise a plurality of juxtaposed paddle-chains, said output conveyor comprises a single-track output conveyor; and wherein said intermediate conveyor, said transition conveyor and said output conveyor include common drive means.

10. The apparatus for the pressureless alignment of objects according to claim 1, wherein said intermediate conveyor is downwardly inclined in the direction of travel of the objects.

* * * * *